United States Patent [19]

Shank, Jr.

[11] Patent Number: 5,557,556
[45] Date of Patent: Sep. 17, 1996

[54] POWER PLANT SIMULATION FOR WATERBORNE VESSEL COMPUTER-ASSISTED DESIGN AND EVALUATION

[75] Inventor: Samuel R. Shank, Jr., Arnold, Md.

[73] Assignee: The United States of America as represented by the Secretary of the Navy, Washington, D.C.

[21] Appl. No.: 312,952

[22] Filed: Sep. 30, 1994

[51] Int. Cl.⁶ ................................................ B63H 21/00
[52] U.S. Cl. ............................................................ 364/578
[58] Field of Search ................................... 364/578, 580, 364/571.04, 474.24, 191, 192, 468, 488, 512; 395/152; 440/3, 113

[56] References Cited

U.S. PATENT DOCUMENTS

| | | | |
|---|---|---|---|
| 4,697,239 | 9/1987 | Sicard et al. | 364/468 |
| 4,700,317 | 10/1987 | Watanabe et al. | 364/488 |
| 4,831,546 | 5/1989 | Mitsuta et al. | 364/512 |
| 5,019,961 | 5/1991 | Addesso et al. | 364/192 |
| 5,455,902 | 10/1995 | Ellson et al. | 395/152 |

Primary Examiner—Kevin J. Teska
Assistant Examiner—Russell W. Frejd
Attorney, Agent, or Firm—Gary G. Borda

[57] ABSTRACT

The present invention generally relates to the computer-assisted design of complex systems and, more particularly, to the design and analysis of waterborne vessels, especially with respect to specific fuel consumption performance of the vessel engines. The invention is a power plant (e.g., propulsion engines and ship-service engines) simulation method incorporated within the machinery module of a computer-assisted design methodology for designing and analyzing ships. The invention projects the impact of engine choice on overall ship design in the design methodology by characterizing performance characteristics of an engine as a generic equation, a small plurality of equation coefficients, and a small plurality of parameters which may be stored and retrieved for purposes of computation of elements of the ship design. The generic equation is developed as an expression of a curve which best fits dimensionless engine performance data as a function of engine operating values.

19 Claims, 6 Drawing Sheets

| REGISTER | ASSET SYMBOL | REGISTER XLS ENGINE PARAMETER | UNITS |
|---|---|---|---|
| R1 | MODEL IND | MODEL INDICATOR | |
| R2 | TYPE IND | TYPE INDICATOR | |
| R3 | Pc | CONTINUOUS POWER | hp |
| R4 | Nc | CONTINUOUS SPEED | rpm |
| R5 | Mc | AIR MASS FLOW | lb/s |
| R6 | Tc | EXHAUST TEMPERATURE | deg F |
| R7 | Sc | SPECIFIC FUEL CONSUMPTION | lb/hp-hf |
| R8 | W | WEIGHT | 1 ton |
| R9 | L | LENGTH | ft |
| R10 | Z | WIDTH | ft |
| R11 | H | HEIGHT | ft |
| R12 | f | FRICTION (SCALING) FACTOR | |
| R13 | SFC EQN IND | Sfc EQUATION FORM | |
| R14 | C1 | EQUATION COEFFICIENT | |
| R15 | C2 | EQUATION COEFFICIENT | |
| R16 | C3 | EQUATION COEFFICIENT | |
| R17 | C4 | EQUATION COEFFICIENT | |
| R18 | C5 | EQUATION COEFFICIENT | |
| R19 | C6 | EQUATION COEFFICIENT | |
| R20 | C7 | EQUATION COEFFICIENT | |
| R21 | C8 | EQUATION COEFFICIENT | |
| R22 | C9 | EQUATION COEFFICIENT | |
| R23 | C10 | EQUATION COEFFICIENT | |
| R24 | C11 | EQUATION COEFFICIENT | |

POWER PLANT SIMULATION FOR WATERBORNE VESSEL COMPUTER-ASSISTED DESIGN AND EVALUATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to the computer-assisted design of complex systems and, more particularly, to the design and analysis of waterborne vessels, especially for specific fuel consumption performance.

2. Description of the Prior Art

Many areas of human endeavor involve the design of complex systems which may involve application of the latest engineering knowledge in a wide variety of technologies. Naval architecture is a particular field in which many engineering disciplines must be employed at a very high level to accomplish designs having desired performance. In the design of a new ship, for example, the ideal design strategy is to start with the closest existing design, determine changes dictated by desired differences in performance or intended use and to then have those changes reconciled by each of a succession of groups of engineers highly skilled in a limited area of ship design; each group further implementing changes to reconcile not only changes from the original design but changes implemented by preceding groups in response to those changes. Since this process is considered likely to converge (or rapidly reveal divergence when an integrated solution is not possible) it has come to be known as a design spiral, schematically illustrated in FIG. 1.

Figure 1:
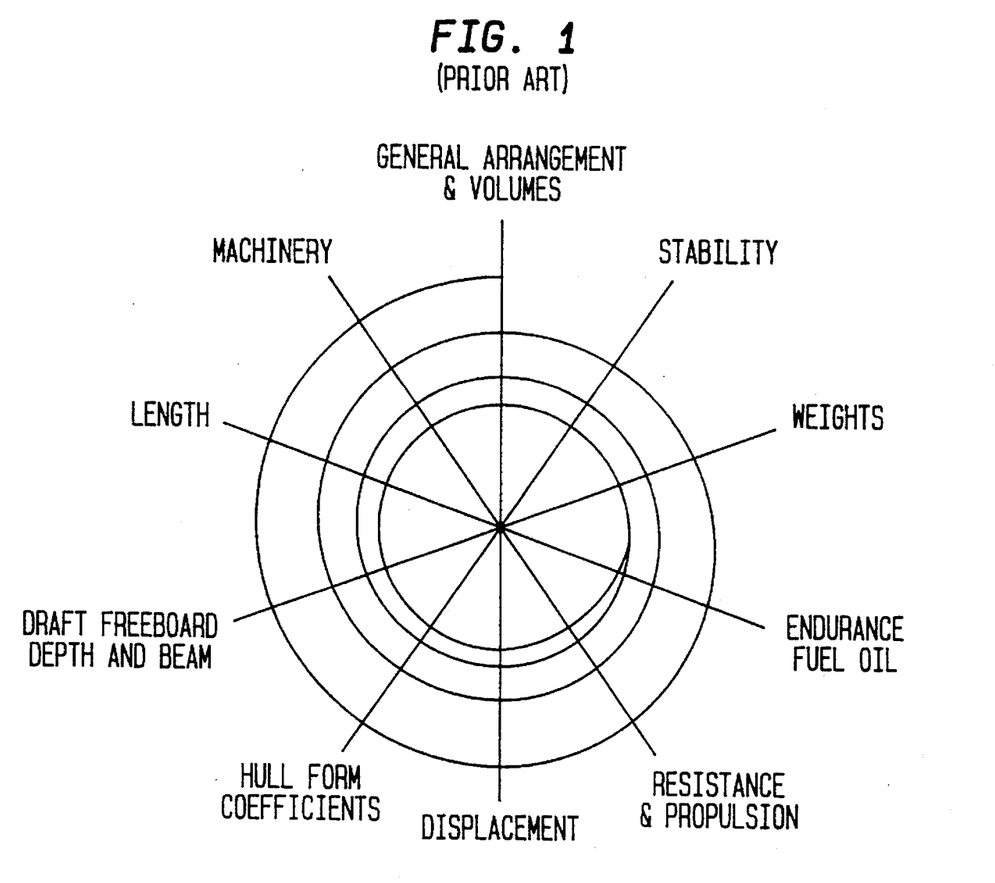
FIG. 1 is a schematic depiction of a prior art design methodology.

As shown therein, the purposes of the new ship are first, for example, accommodated by definition of displacement and general dimensions and allocation of the large volumes of the vessel. The design is then evaluated for machinery requirements such as motive power, auxiliary power, hydraulics for control, on board heavy equipment, etc. and the dimensions of required machinery and other required spaces such as stack volumes are determined and incorporated into the design. Then the design is passed to another group which determines the required length of the vessel based on the initially designated volumes and the volumes required for machinery. Then the design is passed to a group to determine other hull parameters such as draft, beam, freeboard given the intended use and anticipated sea conditions and the design parameters established by the previous design groups.

Next, the hull shape is determined to provide minimum drag and other performance requirements within the basic hull dimension specifications. Then, another group determines the displacement in accordance with the preceding design work and specifications so far developed, such as inclusion of machinery weight. At this point, hull performance can be evaluated and propulsion requirements defined for desired cruising and top speeds. Then, endurance requirements can be evaluated and accommodated by determination of fuel requirements and the volume of the vessel which will be required to contain a sufficient amount of fuel. Then weights, including fuel can be evaluated and previously determined displacement and volume allocations can be refined. Finally, stability is evaluated and previous specifications refined to improve the performance and insure safety in anticipated sea conditions.

At this point, however, volume allocation may have been changed to the point that a further cycle of design refinements might ideally be called for and the cycle could, in theory, be repeated until no further design changes were specified by any group. This circumstance corresponds to the inner circle terminating the design spiral of FIG. 1 when all facets of the design converge.

As a practical matter, however, the cost of this analysis and design refinement is so great and time consuming that the design will be considered complete well before such a convergence occurs. For this reason, designs have, in the past, often been far less than optimal and performance of vessels, when constructed, has often been disappointing and below design specifications. In some cases, the resulting vessel, when constructed, may be unsuitable for the service intended or the performance so marginal that customer or user acceptance will be impaired; having adverse effects on profitability of the vessel or other aspects of its use. In naval vessels in particular, various aspects of the performance of a vessel may seriously impact the ability of the crew to carry out its assigned mission.

Figure 2:
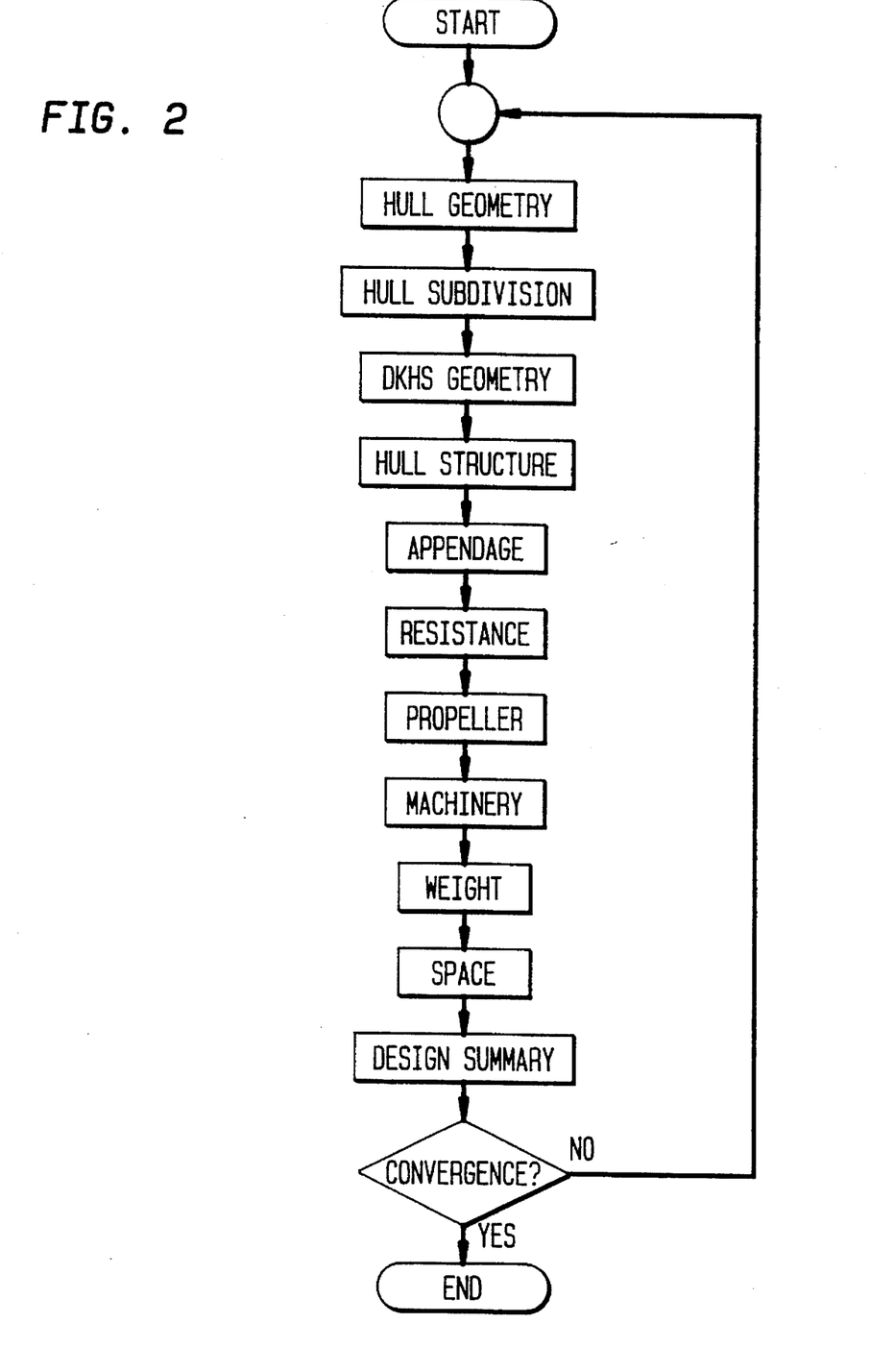
FIG. 2 is a flow chart generally summarizing a proprietary computerized design methodology forming an environment for the present invention.

Therefore, in order to more fully refine ship designs, a family of computer implemented ship design programs have recently been developed for use in the early design phases of surface ships. These computer programs are proprietary to the United States Navy and are collectively referred to as the Advanced Surface Ship Evaluation Tool (ASSET). Currently, a separate program is used for each type of ship (e.g. hydrofoils, tankers, etc.) for which a design is required. An exemplary set of procedures is shown in FIG. 2 as a circulating flow chart generally implementing a design spiral, as described above, each "step" depicted, itself, being a program for that portion of the design and referred to as a "module". As a final step in the process, the performance of the design is evaluated and a determination is made as to whether or not convergence can be considered to have been achieved.

Even with very substantial computing power, however, an iteration of one loop of this system can be very expensive in terms of processor time. Particularly when numerous technologies are available for use in a portion of the design, such as for power systems, as is presently the case, and these technologies may have a major impact on many aspects of the design, such as performance, weights, volumes and, especially, endurance, it was found that performing an entire circuit of the loop to evaluate many possible choices for power systems was impractical and presented a major obstacle to the efficacy of the entire computer implemented design procedure. On the other hand, since engine selection impacts many features of the design, especially from the standpoint of space allocation for fuel tankage, results must be obtained from many modules of the asset program to determine the appropriateness of a particular engine choice and no alternative existed for obtaining such information without traversing the design refinement loop. Further, diverse technologies may require different forms of analysis for simulation and have different requirements (e.g. stacks, gear boxes, auxiliaries) which may force alternative courses in design; potentially causing design divergence.

SUMMARY OF THE INVENTION

It is therefore an object of the present invention to provide a technique of simulation and evaluation for purposes of comparison of technologies (e.g., engine choice) in the course of computer aided design of complex systems (e.g., ship design).

It is another object of the invention to provide a unified methodology for the accurate description of alternative technologies within a simulation arrangement.

It is a further object of the invention to provide accurate and processor efficient characterizations as functions of particular technologies associated with, for example, machinery type, arrangement, component selection, system operations, design variables and margins.

It is another further object of the invention to provide a methodology wherein design refinement may be optimally accomplished within a module of an automated design methodology.

It is yet another object of the invention to provide an enhancement of interactivity of a design application with a user to accelerate refinement of a design under development which accommodates potentially radically varying technologies and facilitates comparison thereof within a simulation of a design.

In order to accomplish these and other objects of the invention, a method of computer assisted design is provided including the steps of defining performance of an element of the design as a dimensionless parameter expressed as a function of a performance value, applying a curve fitting process to the function to derive an equation and a plurality of coefficients, storing an expression of the equation and the coefficients, specifying an element of a design, retrieving an equation and corresponding coefficients together with performance parameters from memory in accordance with the element, and evaluating a performance simulation in accordance with the equation, coefficients and parameters.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 3:
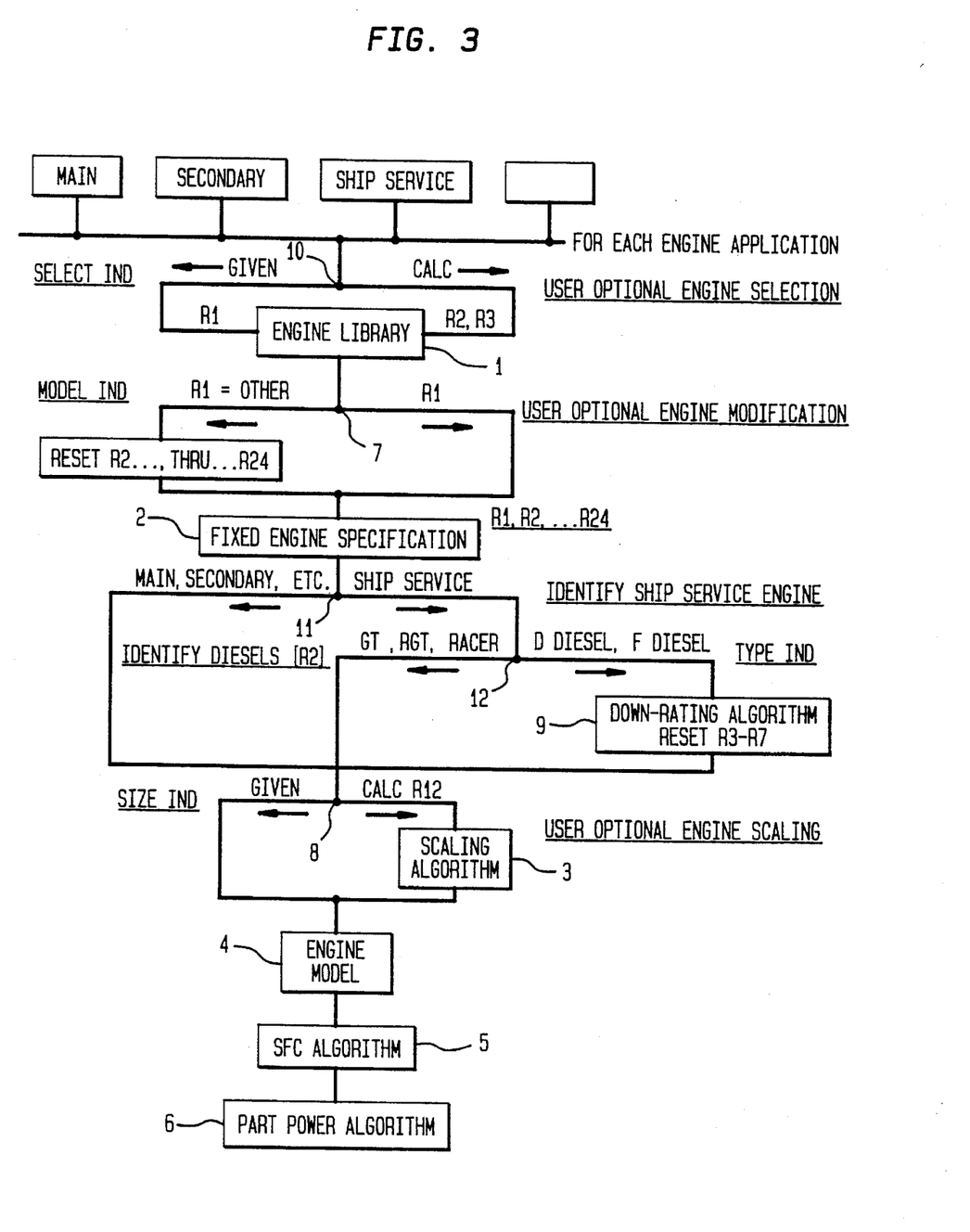
FIG. 3 is a flow chart depicting the methodology of the engine simulation portion of the machinery module of FIG. 2.

Referring now to the drawings, and more particularly to FIG. 3, there is shown a flow chart depicting the internal operation of the engine simulation method within the machinery module of FIG. 2 as implemented with the present invention. It is to be understood that no admission is made and no inference is to be drawn that any portion of FIG. 2 or FIG. 3 is prior art as to the present invention. It is also to be understood that, while the present invention will be described, where appropriate, in terms of data structures, special purpose data processing devices and storage devices and hardware which would enhance performance, the invention is preferably carried out in software on a suitably programmed general purpose computer for compatibility with the remainder of the environment in which the invention is advantageously used and the above-mentioned ASSET system, in particular. Further, while the invention will be discussed herein in terms of a preferred application for projecting the impact of engine choice on ship design and use in the ASSET design methodology, in particular, it is to be understood that applications of the methodology and implementation therein are not so limited and the invention can be advantageously practiced in many other environments and in regard to the performance of any design element (e.g., engine choice) which affects the performance of the overall system design (e.g., ship design).

As shown in FIG. 3, the application of the engine is first specified (e.g., use as a main or secondary propulsion engine or as a ship service engine). Although all applications are treated identically by the engine simulation system in accordance with the invention, this parameter provides the machinery module with linkages to other modules and identifies particular engines in the design. Then, at node 10, the user, by means of a terminal 10 including a keyboard and display, selects a fixed engine characterization (GIVEN) by choosing a specific engine stored in engine library 1 or, alternatively, specifies selected engine characteristics (CALC) to determine possible engine choices from engine library 1. This provides a first indicator, SELECT IND, which will be described below, to the machinery module. This branching results in either a choice of engine which is identified in the data structure of FIG. 5 as R1 or allows a calculation based on engine type and required power (i.e., required shaft horsepower which may be supplied by the user or by other modules of the ASSET program as described below) to indicate possible engine choices. In either case, a fixed engine specification taken from engine library 1 is made available to the system and placed in registers R1–R24 shown in FIGS. 5 and 7. This engine specification includes numerical string data or indicators about the nature of the engine and the simulation processes to be carried out as well as, for purposes of ship design (as will be assumed hereinafter), numerical data about engine performance, rating, size and fuel consumption.

Next, a model indicator, MODEL IND, which will be described below, identifying the engine is evaluated by the system and may be changed by the user. Thus, at node 7, the user may specify R1=OTHER, which then allows the user to reset any or all specifications R2–R24. Otherwise, the MODEL INDICATOR chosen from engine library 1 and identifying a specific engine having a fixed engine specification associated therewith is retained at R1 and associated engine specifications are placed in registers R2–R24. The engine specification is then considered to be fixed and complete. Then depending on the use to which the engine is to be put (e.g., main or secondary propulsion engine or ship service engine), as earlier established, branching is performed at node 11. This allows the possible types of engine choices to be limited by design rules implicit in the machinery module for the version of the ASSET system specific to the type of vessel being designed and to bypass down-rating algorithms 9 which should only be applied to engines placed in certain types of service (e.g. ship service diesel engines for driving generators and the like). It is well known in the art that when a diesel engine is used as a ship service engine to produce ship service power it must be operated at standard generator speeds. Thus, as shown in FIG. 3, at node 11 main and secondary propulsion engines follow one branch that avoids down-rating algorithm 9 while ship service engines follow the opposite branch. Next, at node 12 diesel engines follow the branch that allows down-rating algorithm 9 to reset data in registers R3–R7 (shown in FIG. 5) based on standard generator speeds in a manner well known in the art.

Next, a size indicator, SIZE IND, is established so that engine specification data can be used either directly (GIVEN) or scaled (CALC) using predetermined scaling algorithms 3 to meet known power requirements as may be chosen at node 8. Using techniques well known in the art, scaling algorithm 3 rises a friction factor associated with each engine in engine library 1 and stored at register R12 to modify engine specification data to meet known power requirements. When the data is used unscaled, the data may be used to establish the power available from that engine or modified to simulate engine performance above or below rated performance. In either event, an engine model 4 is established for simulation of performance in a particular ship design.

Thereafter, various ones of a set of generic "specific fuel consumption" (sfc) algorithms may be applied; the particular implementation of which is considered to be an important feature of the present invention. Application of these algorithms estimates certain engine characteristics for each engine model and for particular uses, such as use as a main or secondary propulsion engine or a ship service engine (for powering generators, hydraulic systems etc.). Likewise, a set of part power algorithms may be used to simulate engine characteristics under various operating conditions.

While the engine model 4, sfc algorithms 5, part power algorithms 6, down-rating algorithms 9, engine library 1 and scaling algorithms 3 are the key elements of the operation of the engine simulation portion of the machinery module, the particular algorithms implemented are not critical to the practice of the invention which can be practiced, with modification, on arbitrary algorithms. However, in the overall methodology, as implemented including the invention, it is important to note that the engine model 4 contains all characteristic data necessary to describe the engine, including linkage to the scaling and sfc algorithms 3, 5. Therefore, particularly in an implementation in accordance with the invention, the fixed engine data is retained and the modelling of the engine changes with power requirements and operating conditions, thus more accurately following the continuous spectrum of performance of a particular engine under varying conditions and with a minimum of stored data, as will be discussed in greater detail below.

As an example of the engine model 4, the data set includes (for the particular application of the invention assumed above) five indicators in the form of string data. These indicators select particular computational paths in the module as is shown in FIG. 3. In the preferred application of the invention these indicators are TYPE IND, MODEL IND, SELECT IND, SFC EQN IND, AND SIZE IND. TYPE IND identifies the general engine types as follows:

| TYPE IND | GT | simple-cycle gas turbine |
| | RGT | gas turbine, recuperated |
| | RACER | gas turbine, rankine energy recovery |
| D Diesel | domestic diesel |
| F Diesel | foreign diesel |

These type indicators (TYPE IND) select and incorporate in the design certain auxiliary factors and processes unique to an engine type. For example, a recuperated gas turbine (RGT) requires a recuperator and an intercooler to be incorporated in the design whereas a RACER requires a steam bottoming cycle including a boiler, steam turbine and condenser. Such auxiliary factors and processes are well known in the art.

A model indicator (MODEL IND) is provided for the purpose of controlling node 7. It is preferred that specific engines for which data is present in the engine library be selectable from a menu; one option selectable therefrom being "other" which causes branching for user input of fixed engine specifications. Similarly, a size indicator (SIZE IND) controls node 8 to cause branching and invocation of scaling algorithms. A select indicator (SELECT IND) parameter is also preferably provided to allow the user to select a particular engine from engine library 1 or have the program do so (at node 10) from design data (e.g. R2, R3) available from other modules of the methodology of FIGS. 2 and 6, but is not critical or necessary to the practice of the invention.

The sfc equation indicator (SFC EQN IND) is, however, an important feature of the invention. This indicator specifies which of a family of generic sfc equations is used to model the fuel consumption of the engine being simulated in connection with the ship design. At the present time, these generic equations are, nominally:

| POLY 2 | second order polynomial form |
| EXPNT | exponential form |
| RATIONAL | rational form |
| POLY QN or POLY X | complex polynomial forms |
| DIESEL | diesel engine typical form |
| other | specifies a unique equation |

Additionally there are, for the assumed application, five numerical values describing the continuous rating of the engine under standard conditions of one atmosphere, zero relative humidity, zero engine bleed air, 100 degree F. temperature, four and six inches pressure drop at the intake and exhaust, respectively, and fuel with a heating value of 18,400 BTU/lb. These are $Pc$=engine continuous power available $Nc$=engine continuous rotational speed $Mc$=engine air mass flow $Tc$=engine exhaust temperature $Sc$=engine specific fuel consumption, continuous These engine library parameters (indicators and numerical values) are the basis of extremely numerous calculations within the machinery module for sizing of various machinery such as gears, shafting, propellers, ducting, and auxiliary devices such as those mentioned above and the overall ASSET methodology of FIG. 2. Additionally, as engine library 1 parameters, four numerical values reflecting the bare engine weight, height, width and depth are also provided for calculation of sub-bases, enclosure modules, foundations (e.g. vibration damping), space requirements, etc. A friction factor is also provided as a numerical parameter for the purpose of controlling scaling in scaling algorithm 3.

As alluded to above, while the actual algorithms to which the invention may be applied are largely arbitrary, the invention is principally concerned with an implementation within the environment and especially the ASSET design methodology which has already been described. In the preferred application of the invention, the specific fuel consumption is of particular importance because it determines the vessel's fuel tankage and the implementation to be hereinafter described can be used, with modification, to allow comparative evaluations of technologies having potentially radically varying characteristics during the performance of simulation is order to accelerate refinement of the design process. This implementation, as will be described below, also minimizes storage requirements and computational overhead and allows for enhancement of user interaction by projecting preliminary impact of changes in design choices on other portions of the design without traversing the entire design refinement loop.

In order to accomplish these meritorious effects of the invention, it has been discovered that potentially radically different technologies can be reconciled for analysis and comparison by applying any of a plurality of curve fitting techniques to performance data (referenced to standard conditions) and expressing, for storage, retrieval and computation, the performance data as one of a small plurality of best fitting equations (e.g. POLY 2, EXPNT, RATIONAL, POLY QN, POLY X, and DIESEL, as described below), a small number of parameters (e.g., s, p, q and n, as described below) and a small number of coefficients (e.g., C1–C11, as described below). (It is believed to be preferable in most applications of the invention, as will be seen below, to be advantageous to normalize performance curve data to one of the technologies involved, in which case, none of the coefficients would be used in at least one of the equations.) Since equations derived from curve fitting are generally of a relatively simple form, the laborious curve fitting process can be precomputed and the equation derived from curve fitting later evaluated for particular parameters at high speed based on the coefficients. In the preferred application of the invention, the best fitting equation to the actual sfc performance data curve and the coefficients are linked to the engine model and the engine library through the SFC EQN IND. Only eleven coefficients are needed, C1–C11, which are accessed as an array as engine library parameters together with the equation and in response to a nominal identification of the engine (or other element of the design).

Figure 4:
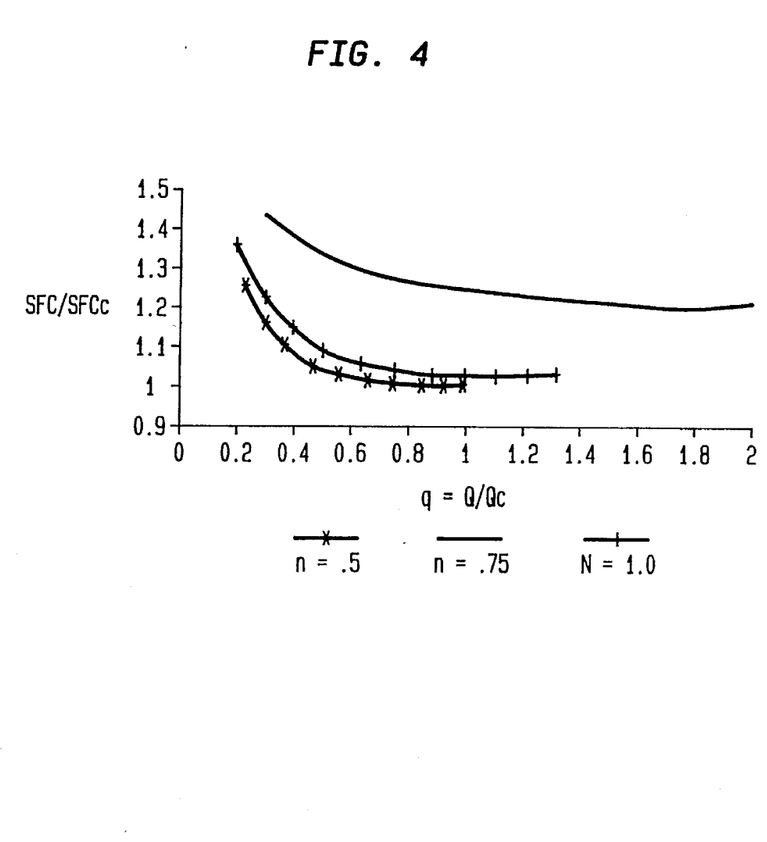
FIG. 4 is a typical set of performance curves related to specific fuel consumption.

In a preferred embodiment of the invention, as shown in FIG. 4, dimensionless numerical values SFC/SFCc representing specific fuel consumption (ratio of part power condition to continuous power condition) as a function of engine torque Q and speed N are put into a curve fitting program such as SigmaPlot (a trademark of Jandel Corp.), commercially available through Jandel Scientific, to determine which of the six generic sfc algorithms noted above provides the best fit to the resulting curve. The identifying indicator (SFC EQN IND) for the best fitting generic curve is stored at register R13 while the equation coefficients (C1–C11) are stored at registers R14–R24. These equations are written in terms of four dimensionless parameters:

p=P/Pc power ratio, part power to continuous q=Q/Qc torque ratio, part power to continuous n=N/Nc speed ratio, part power to continuous and s=SFC/Sc specific fuel consumption ratio, part power to continuous.

The generic sfc equations presently in use and their identifying indicators are:

POLY 2

$$s=(1/p)[C1+C2(q)+C3(n)+C4(qn)+C5(q)^2+C6(n)^2+C7(qn)^2]$$

EXPNT $$s=(1/p)[C1+C2(e)^{(C3(n))}+C4(q)(e)^{(C5(n))}+C6(q)^{C7}+C8(n)^{C9}]$$

RATIONAL $$s=(1/p)[C1(q)+C2(n)+C3]/[C4+C5(n)]$$

POLY QN $$s=(1/p)[C1+C2(n)^{C3}(q)^{C4}+C5(n)^{C6}(q)^{C7}+C8(q)^{C9}+C10(n)^{C11}]$$

POLY X $$s=(1/p)[C1+C2(q)^{C3}+C4(n)^{C5}+C6(qn)^{C7}+C8(q)^{C9}+C10(n)^{C11}]$$

DIESEL $$s=0.978056(e)^{[0.355(q-0.75)(q-0.75)]}$$

(note—e=2.71828 . . . in the above equations)

Figure 5:
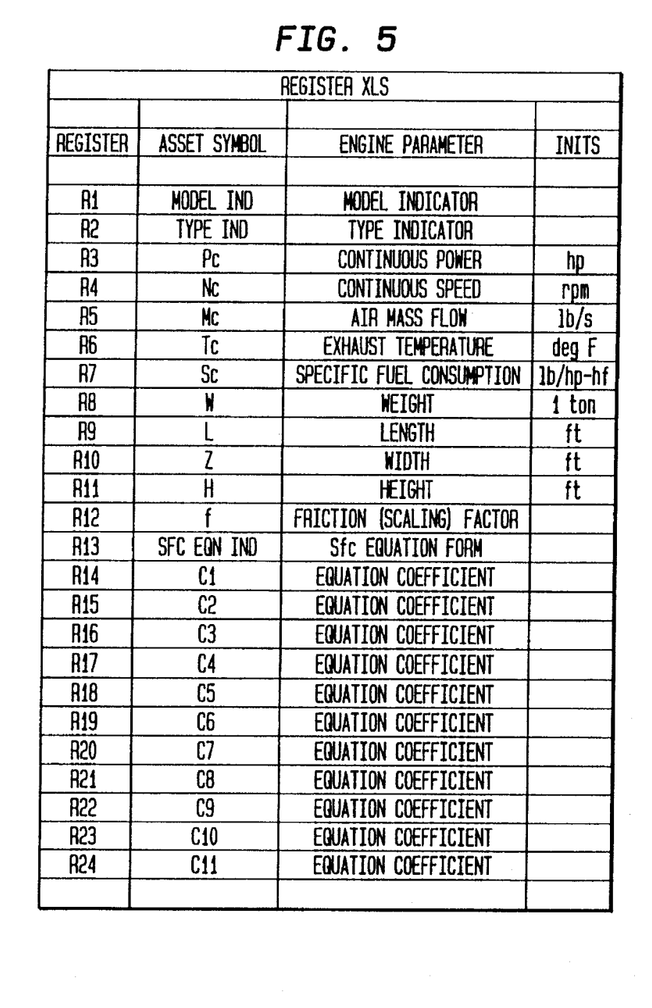
FIG. 5 is a representation of the data structure used in the present invention.

Other algorithms for part power and down-rating basically amount to weighted scaling and are implemented in a straightforward manner which will be evident to those skilled in the art and need not be further discussed. Note, however, that it is preferred to use the down-rating algorithm 9 to reset the data in registers R3–R7 (i.e., Pc, Nc, Mc, Tc and Sc indicating engine power, speed, air mass flow, exhaust temperature and specific fuel consumption, all at the continuous power condition) for recomputation of sfc. Nevertheless, it is considered that the application of the implementation in accordance with the invention to two or more algorithms (e.g. to accommodate combinations of diverse technologies) is within the scope of the present invention. It is also to be understood that other modules in the overall design algorithm such as weight, size and location of engines and their associated auxiliaries can be immediately provided with the sfc and other data derived from the machinery module and the preliminary impact on the overall design immediately evaluated for acceptability and the possibility of convergence without necessarily cycling through the entire design loop of FIG. 2.

That is, if a different engine is selected for ship service power, it and the volumes required for auxiliaries, tankage and all other required revisions of the design can be computed and evaluated at the same stage of design and on the basis of the same constraints as another previously evaluated engine by accessing a very limited number of items from memory. In this case, the engine related data items stored for each engine number only twenty-four (R1–R24) and are illustrated in tabular form according to established register numbers in FIG. 5.

Figure 6:
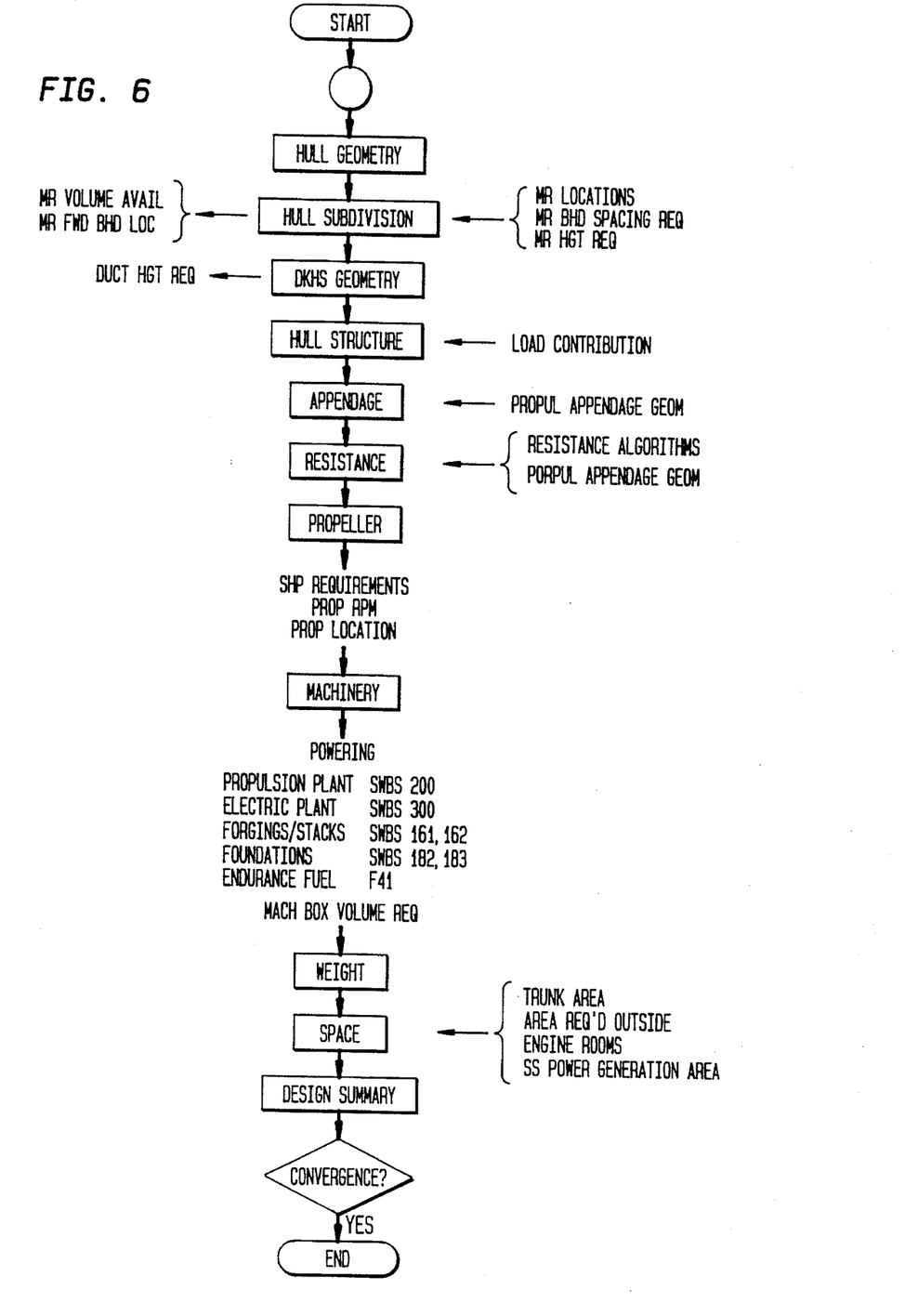
FIG. 6 is an expansion of FIG. 2 showing the function of the invention therein.

In the interest of completeness, the linkages to other parts of the ASSET methodology are illustrated in FIG. 6. The propeller module directly feeds the shaft horsepower (SHP) requirements, the design propeller RPM and the propeller location to the machinery module which directly outputs the propulsion and electric plant identifications, stacks and forgings required thereby, foundations, endurance fuel quantities and machinery box volumes to the weight module, directly following the machinery module. Outputs are also made of load contribution to the hull structure module so that girders and other structural members can be redesigned, propulsor appendage geometry is provided to the appendage module and resistance is computed and provided to the resistance module so that impacts of required design changes such as location and dimensions of bulkheads can be immediately evaluated for conflicts and which can be automatically detected, in most instance, by the ASSET methodology so that progress toward convergence of the design can be assured.

Figure 7:
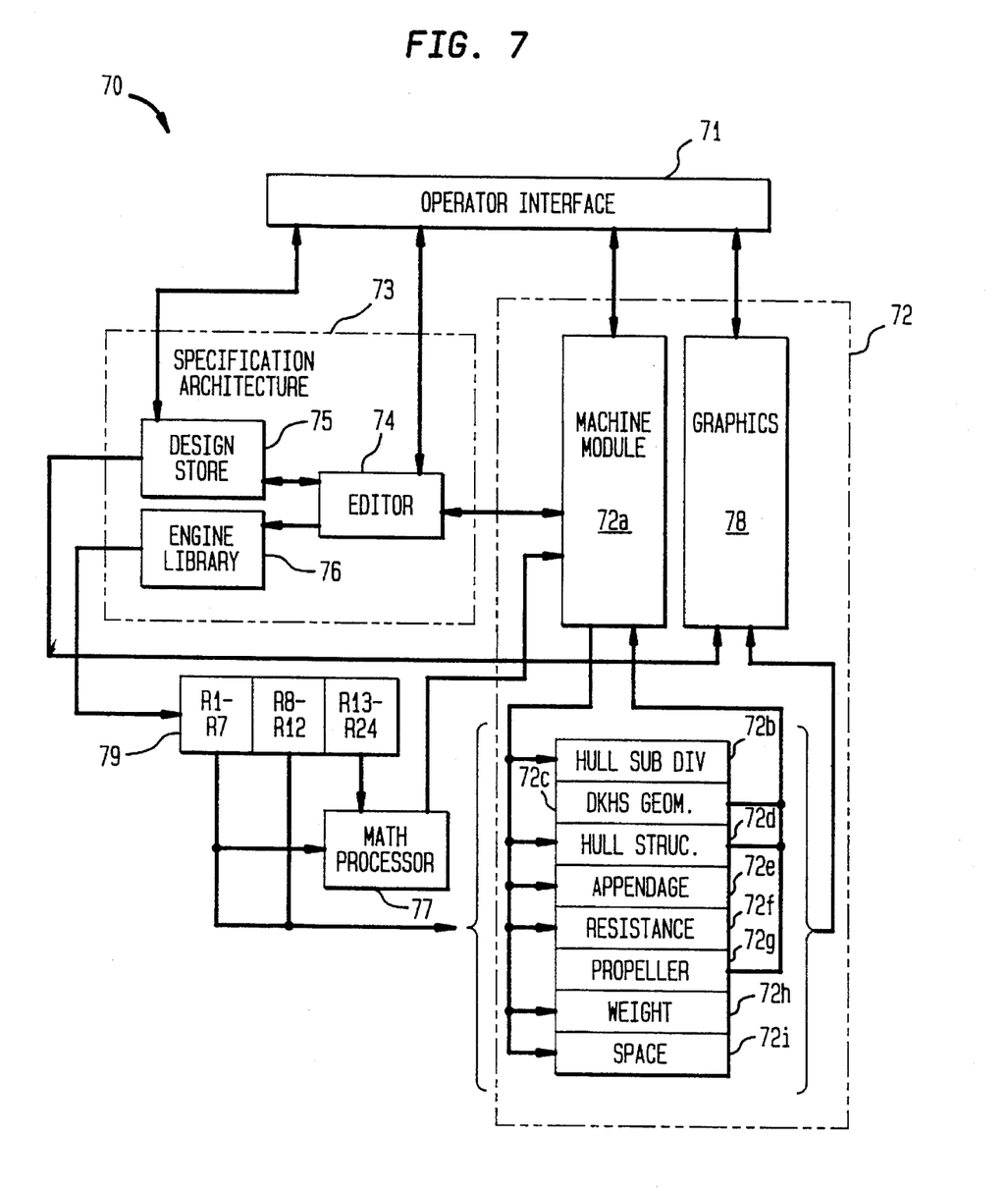
FIG. 7 is a schematic diagram of a preferred architecture of the overall system including the invention.

The architecture of this implementation 70 is schematically shown in FIG. 7. The operator interface 71, including a terminal having a keyboard and a display, communicates directly with an editor 74 and a memory 75, containing the overall design, which are included with the engine library memory 76 in a data structure 73 referred to as the specification architecture. Operator interface 71 also communicates directly with the machine module 72a (as well as other modules of the ASSET system 72 including modules 72b–72i). Thus, through the machine module 72a, the user can exercise control over the editor 74 to access data from the engine library 76. Library 76 engine data can also be modified directly through the editor 74 by the operator, such as in the case where branching is chosen at node 7 of FIG. 3 to enter custom specifications. The engine library 76 outputs the data stored in accordance with the data structure of FIG. 5 to registers R1–R24 preferably configured in Random access memory 79. R1–R7 and R13–R24 are then preferably provided to a mathematical processor to expedite the processing of sfc data from the named generic sfc equation and coefficients C1–C11; reporting the results to the machine module 72a. Engine data in registers R1–R12 is also fed to modules 72b–72i while engine performance and other data linked by the type indicator and size indicator are provided to modules 72b, 72d, 72e, 72f, 72h and 72i. Modules 72b–72i can then be selectively operated to make computations and design refinements which can be displayed to the user together with other design data from design storage memory 75 through graphics processor 78. Additionally, modules 72c, 72d and 72g report directly to the machine module 72a for computation of performance data which can then be displayed to the user through the interface 71.

Of particular importance, the direct inputs of locations and spacing requirements to the hull subdivision module 72b and indirect inputs to the deck house module 72c (through the hull subdivision module 72b can thus provide further outputs to the machinery module 72a and the implications of a change in the design from the machinery module 72a can thus be made to loop through these particular modules to project the effects of several iterative loops through the full design sequence without the actual performance of more than a very small fraction of the full design refinement loop of FIG. 2 or 6. In this way, the design refinement process can be projected to allow engine choices to be made with more confidence and at an earlier stage, thus accelerating the design refinement process. By the same token, the user is enabled to more deeply interact with the design tool and more fully evaluate the full impact of choices on the final design, thus encouraging experimentation and facilitating creativity on the part of the designer.

To summarize, virtually all of the implications of particular engine choices can be implemented in accordance with the invention by the accessing of strings from an engine library. All necessary predictions of specific fuel consumption, regardless of technology can be obtained by accessing an equation by indicator name together with not more that eleven coefficients and eight parameters and performing a relatively simple computation.

In view of the foregoing, it is seen that the invention provides a technique of design refinement, simulation and evaluation which facilitates comparison of different design choices, even when those choices may involve radically differing technologies. The invention also provides a methodology where engine performance or other data may be accurately characterized over a wide range of operating conditions. The design refinement process and the quality of the interface with a user are both enhanced by permitting the effects of a design choice to be immediately projected onto and carried forward in many aspects of the design without the necessity of traversing the entire design refinement methodology.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of evaluating impact of engine choice during the computer assisted design of waterborne vessels, the method comprising the steps of:

defining a plurality of generic equations representative of engine specific fuel consumption as a function of at least one engine performance parameter, each of said plurality of generic equations having associated therewith an equation indicator;

providing an engine library containing therein a plurality of engine specifications, each of said plurality of engine specifications defining an engine in terms of a plurality of geometric and performance parameters, said performance parameters including said at least one engine performance parameter and one of said equation indicators;

selecting an engine from said engine library, said selecting having associated therewith a predetermined engine application;

retrieving said engine specification associated with said selected engine from said engine library;

storing said retrieved engine specification in an engine model;

retrieving one of said plurality of generic equations based on said equation indicator stored in said engine model; and evaluating an engine performance simulation at predetermined operating conditions of the waterborne vessel, said evaluating being performed in accordance with said retrieved equation and said plurality of geometric and performance parameters stored in said engine model, wherein said evaluation provides geometric and performance characteristics required for designing propulsion and ship service power producing machinery for the waterborne vessel.

2. A method as recited in claim 1 wherein said plurality of geometric and performance parameters in said engine specification including:

an engine indicator identifying said engine;

a type indicator indicating a generic engine type having associated therewith auxiliary equipment unique to said generic engine type;

continuous rating parameters including a continuous power, a continuous rotational speed, an air mass flow, an exhaust temperature and a specific fuel consumption, wherein said continuous rating parameters corresponds to a continuous power condition;

geometric parameters including a weight, a length, a width, a height and a friction scaling factor; and specific fuel consumption parameters including said equation indicator identifying one of said plurality of generic equations and a plurality of coefficients associated with said one of said plurality of generic equation.

3. A method as recited in claim 1 wherein said generic engine types include a simple-cycle gas turbine, a recuperated gas turbine, a rankine cycle energy recovery gas turbine, a domestic diesel and a foreign diesel.

4. A method as recited in claim 1 wherein said engine application is chosen from the group consisting of a main propulsion engine, a secondary propulsion engine, a combination of a main propulsion engine and a secondary propulsion engine, and a ship service engine.

5. A method as recited in claim 3, including the further step of:

determining a required engine type and a required performance parameter and basing said selecting of said engine on said required engine type and said required performance parameter, said required engine type being selected from said plurality of generic engine types.

6. A method as recited in claim 1 wherein each of said plurality of geometric and performance parameters is stored in a register in said engine model and wherein said plurality of geometric and performance parameters in said engine model include:

an engine indicator stored in register R1;

a type indicator indicating a generic engine type stored in register R2;

continuous rating parameters including a continuous power stored in register R3, a continuous rotational speed stored in register R4, an air mass flow stored in register R5, an exhaust temperature stored in register R6 and a specific fuel consumption stored in register R7, wherein said continuous rating parameters corresponds to a continuous power condition;

geometric parameters including a weight stored in register R8, a length stored in register R9, a width stored in register R10, a height stored in register R11 and a friction scaling factor stored in register R12; and specific fuel consumption parameters including said equation indicator identifying one of said plurality of generic equations stored in register R13 and a plurality of coefficients associated with said one of said plurality of generic equation stored in register R14–R24.

7. A method as recited in claim 1, including the further step of:

modifying at least one of said geometric and performance parameters stored in said engine model prior to said evaluating step.

8. A method as recited in claim 6, including the further step of:

modifying at least one of said geometric and performance parameters stored in said engine model prior to said evaluating step.

9. A method as recited in claim 6, including the further steps of:

determining an engine application, said engine application being chosen from the group consisting of a main propulsion engine, a secondary propulsion engine, a combination of a main propulsion engine and a secondary propulsion engine, and a ship service engine;

determining an engine type, said engine type being chosen from the group consisting of a simple-cycle gas turbine, a recuperated gas turbine, rankine cycle energy recovery gas turbine, a domestic diesel and a foreign diesel; and wherein when said engine application is said ship service engine and said engine type is said domestic diesel or said foreign diesel, performing a down-rating calculation to reset performance parameters stored in registers R3–R7, said down-rating calculation being based on a standard generator speed.

10. A method as recited in claim 1, including the further steps of:

performing a scaling calculation to reset at least one of said geometric and performance parameters stored in said engine model, said scaling calculation being based on said friction scaling factor and a predetermined required power.

11. A method as recited in claim 1, wherein said computer assisted design is modular and said plurality of generic equations and said engine library are provided in a first module, said method including the further steps of:

performing a calculation including at least one of said engine specifications in said engine library;

providing a result of said calculation to a second module;

performing at least one further calculation in said second module to obtain a further result; and performing another calculation in said first module using said further result.

12. A method as recited in claim 1, wherein said method is practiced within the ASSET surface ship design program, said ASSET program being a modular design system, said said ASSET program including a hull geometry module, a hull subdivision module, a deckhouse geometry module, a hull structure module, an appendage module, a resistance module, a propeller module, a machinery module wherein said method is exercised within said machine module, a weight module, and a space module.

13. A modular computer assisted design system for designing waterborne vessels, said system comprising:

a first module including:

a design library including therein a plurality of generic equations representative of engine specific fuel consumption as a function of engine performance characteristics, each of said plurality of generic equations having associated therewith an equation indicator;

an engine library including therein a plurality of engine specifications, each of said plurality of engine specifications defining an engine in terms of a plurality of geometric and performance parameters, said performance parameters including one of said equation indicators;

means for selecting an engine from said engine library;

means for retrieving said engine specification associated with said selected engine from said engine library;

means for storing said retrieved engine specification in an engine model library;

means for retrieving one of said plurality of generic equations based on said equation indicator stored in said engine model library; and means for performing a calculation evaluating an engine performance simulation at predetermined operating conditions of the waterborne vessel, said calculation being performed in accordance with said retrieved equation and said plurality of geometric and performance parameters stored in said engine model library.

14. A system as recited in claim 13, further comprising:

means for transferring results of said calculation in said first module to a second module;

means for performing a further calculation in said second module to obtain a further result; and means for providing said further result to said first module.

15. A system as recited in claim 14, wherein each of said plurality of geometric and performance parameters is stored in a register in said engine model library and wherein said plurality of geometric and performance parameters in said engine model library include:

an engine indicator stored in register R1;

a type indicator stored in register R2;

continuous rating parameters including a continuous power stored in register R3, a continuous rotational speed stored in register R4, an air mass flow stored in register R5, an exhaust temperature stored in register R6 and a specific fuel consumption stored in register R7, wherein said continuous rating parameters corresponds to a continuous power condition;

geometric parameters including a weight stored in register R8, a length stored in register R9, a width stored in register R10, a height stored in register R11 and a friction scaling factor stored in register R12; and specific fuel consumption parameters including said equation indicator identifying one of said plurality of generic equations stored in register R13 and a plurality of coefficients associated with said one of said plurality of generic equation stored in register R14–R24.

16. A system as recited in claim 15, further comprising:

means for modifying contents of said engine model library registers.

17. A system as recited in claim 14, further comprising:

means for indicating a required engine type and a required performance parameter and basing said selecting of said engine on said required engine type and said required performance parameter.

18. A system as recited in claim 14, further comprising:

means for indicating an engine application, said engine application being chosen from the group consisting of a main propulsion engine, a secondary propulsion engines, a combination of a main propulsion engine and a secondary propulsion engine, and a ship service engine;

means for indicating an engine type, said engine type being chosen from the group consisting of a simple-cycle gas turbine, a recuperated gas turbine, rankine cycle energy recovery gas turbine, a domestic diesel and a foreign diesel; and means for performing a down-rating calculation based on a standard generator speed to reset performance parameters stored in registers R3–R7 when said indicated engine application is said ship service engine and said indicated engine type is said domestic diesel or said foreign diesel.

19. A system as recited in claim 14, further comprising:

means for performing a scaling calculation based on said friction scaling factor and a predetermined required power to reset at least one of said geometric and performance parameters stored in said engine model.

* * * * *